(12) United States Patent
Fu et al.

(10) Patent No.: US 9,990,033 B2
(45) Date of Patent: Jun. 5, 2018

(54) DETECTION OF IMPROPER VIEWING POSTURE

(71) Applicant: International Business Machines Corporation, Armonk, NY (US)

(72) Inventors: Lin Fu, Shanghai (CN); Di Hu, Shanghai (CN); Shi Kun Li, Shanghai (CN); Ka Lin, Shanghai (CN); Wei Zuo, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 14/849,152

(22) Filed: Sep. 9, 2015

(65) Prior Publication Data

US 2017/0068313 A1 Mar. 9, 2017

(51) Int. Cl.
*G06F 3/01* (2006.01)
*G06K 9/00* (2006.01)
*G06F 3/03* (2006.01)

(52) U.S. Cl.
CPC ............ *G06F 3/013* (2013.01); *G06F 3/0304* (2013.01); *G06K 9/0061* (2013.01); *G06K 9/00281* (2013.01)

(58) Field of Classification Search
CPC ........... G06F 3/013; G06F 3/014; G06F 3/017
See application file for complete search history.

(56) References Cited

U.S. PATENT DOCUMENTS

| 8,464,160 | B2 | 6/2013 | Sakata et al. | |
|---|---|---|---|---|
| 2012/0133754 | A1* | 5/2012 | Lee | G06F 3/013 348/78 |
| 2014/0285436 | A1* | 9/2014 | Wu | G06F 3/013 345/156 |
| 2014/0355830 | A1 | 12/2014 | Park et al. | |
| 2015/0193014 | A1* | 7/2015 | Yamada | G06F 1/1615 345/156 |
| 2015/0379716 | A1* | 12/2015 | Peng | G06T 7/73 382/106 |
| 2016/0026241 | A1* | 1/2016 | Leung | G06F 3/012 345/156 |

(Continued)

FOREIGN PATENT DOCUMENTS

| CN | 103512547 A | 1/2014 |
|---|---|---|
| CN | 103839386 A | 6/2014 |

OTHER PUBLICATIONS

U.S. Appl. No. 14/929,506, filed Nov. 2, 2015, Entitled "Detection of Improper Viewing Posture".

(Continued)

*Primary Examiner* — Sepehr Azari
(74) *Attorney, Agent, or Firm* — Alexa L. Ashworth; A. Imtiaz Billah

(57) ABSTRACT

Embodiments of the present invention provide efficient and automatic systems and methods for regulating the viewing posture of a user. Embodiments of the present invention can be used to regulate the viewing posture of both juveniles and adults, by providing real-time data analysis of a viewing distance and viewing angle of a device, and generating feedback to a user related to their current viewing posture, while also providing increased supervision of the viewing posture of juvenile device users.

14 Claims, 7 Drawing Sheets

(56) References Cited

U.S. PATENT DOCUMENTS

2016/0050391 A1* 2/2016 Schultz ................ H04N 7/144
348/14.07

OTHER PUBLICATIONS

Appendix P: List of IBM Patents or Patent Applications Treated as Related, dated Nov. 2, 2015, 2 pages.

Chen et al., "Depth Image Based System for Notifying Human Keeping Appropriate Distance from Screen—Implement", Computer Science and its Applications, Lecture Notes in Electrical Engineering, 2015, pp. 1215-1224, vol. 330, Springer Berlin Heidelberg.

Dong et al., "Eyesight Protection Mechanism for a Tablet", An IP.com Prior Art Database Technical Disclosure, IP.com No. 000223205, Nov. 8, 2012, pp. 1-3.

"Core Motion Framework Reference", iOS Developer Library, Updated Sep. 18, 2013, p. 1, <https://developer.apple.com/library/ios/documentation/CoreMotion/Reference/CoreMotion_Reference/index.html>.

"Position Sensors", Android Developers, Printed Jul. 6, 2015, pp. 1-7, <http://developerandroid.com/guide/topics/sensors/sensors_position.html#sensors-pos-orient.

* cited by examiner

DETECTION OF IMPROPER VIEWING POSTURE

BACKGROUND OF THE INVENTION

The present invention relates generally to the field of data processing and analysis, and more particularly to detecting improper posture while viewing a device screen and notifying the user of the improper posture, in order to continuously protect the eyesight of the user.

Mobile electronic devices are becoming more and more common. Mobile electronic devices may be, for example, smart phones, tablet computers, PSPs, and any device in which an electronic screen is eminent. As these mobile electronic devices are not fixed, users may place the devices in any viewing position they choose. Users of these mobile electronic devices may include adults, students, teenagers, and children. Time spent by users of all ages viewing content on mobile electronic devices is increasing.

While mobile electronic devices are beneficial and convenient for searching and/or viewing content, excessive time spent viewing the electronic screen may be harmful to the eyesight of a user, particularly children (i.e., under 18 years of age), as their eyesight may be less developed than an adult's eyesight, and they may not apply the proper viewing postures as consciously as an adult. Some postures, such as lying down (i.e., improper angle of viewing the device) or holding the device screen closely to the user's face, may be more harmful to a user's eyesight, leading to, for example, eye fatigue and/or shortsightedness.

Regulating a user's posture while viewing an electronic device is often not feasible all of the time, especially for an adult supervising the viewing posture of a child. There is a need for automatically regulating the viewing posture of a device user, which includes monitoring both the distance from the screen of a device, as well as, the viewing angle of a user viewing a device screen.

SUMMARY

According to an embodiment of the present invention, a method for regulating the viewing posture is provided. The method comprises identifying, by a front-facing camera, the eye of a device user, based on a set of eye attributes and calculating a distance between the eye of the device user and the screen of a device. The method further comprises determining whether the distance between the eye of the device user and the screen of the device is below a threshold, in which the threshold is a predetermined distance, based on the type of the device in use. The method further comprises sending an alert to the device user, responsive to determining that the distance between the eye of the device user and the screen of the device is below the threshold.

According to another embodiment of the present invention, a method for regulating the viewing posture is provided. The method comprises receiving, from an embedded sensor of the device, information detailing an angle of the device relative to a vantage point. The method further comprises determining whether the angle of the device relative to the vantage point is greater than zero degrees and less than 90 degrees and responsive to determining that the angle of the device relative to the vantage point is greater than or equal to zero degrees and less than 90 degrees, sending an indication to the device user.

Another embodiment of the present invention provides a computer program product for regulating viewing posture, based on the method described above.

Another embodiment of the present invention provides a computer system for regulating viewing posture, based on the method described above.

This may have the advantage that a user need not be constantly conscious of their viewing posture when viewing a device. As the device is constantly monitoring the distance of the device from the eye of the user, as well as the angle of the device against the horizon, a user may be notified in real-time when they are implementing a potentially harmful viewing posture. Embodiments of the present invention may additionally have the advantage that additional components are not needed to regulate the viewing posture of a user, as embodiments of the invention utilize embedded components of computing devices to monitor and calculate a user's viewing posture. Embodiments of the present invention may further have the advantage that the potentially less developed eyesight of a child using the device is better protected, and supervision efforts of a parent of the child may be lessened, as embodiments of the invention provide the feedback as to the posture of the device user, and an indication as to how to adjust an improper viewing posture.

DETAILED DESCRIPTION

Embodiments of the present invention provide systems and methods to monitor data related to a user's viewing posture in real-time. Embodiments of the present invention provide systems and methods to detect a user's viewing posture, including the distance of viewing and the angle of viewing a mobile electronic device screen, and prompt users on how to adjust their viewing posture to a less harmful posture, when the user is in a potentially harmful viewing posture. As mobile electronic devices are not fixed, a user may place the device in any viewing position, and it may be difficult for the user to be continuously conscious of whether they are viewing the device using a proper posture.

Embodiments of the invention may have the advantage that users do not need to monitor their own viewing posture, as the viewing posture of the user is constantly monitored, and the user is automatically notified when they have taken an improper viewing posture, thus aiding in avoiding viewing postures which may harm the eyesight of adults (e.g., eye fatigue or shortsightedness), as well as juveniles (i.e., users under 18 years of age, whose eyesight may still be developing). Embodiments of the invention leverage existing, embedded electronic device technologies, such as an embedded front-facing camera and embedded sensors, and additionally, leverage the computing capacity of the mobile electronic device on which the invention is operating. A more accurate calculation (i.e., error value is less than 5 mm) of the viewing distance is obtained using the embedded front-facing camera, which can emit infrared rays, and measures the distance between the device camera and the user's eye, rather than an interpupillary distance (i.e., the distance between the center of the pupils of the two eyes) which can vary in distance value between different users, leading to less accuracy.

Embodiments of the invention may additionally have the advantage of saving the supervision efforts of parents in regulating the posture of their children, while the children are using and viewing device screens, as the system can automatically detect an improper viewing posture of the child, and send a notification on how to adjust their viewing posture to a less harmful posture (e.g., by moving the device screen further from the eyes of the user, or adjusting the angle of the user viewing the device). Children may not apply the proper viewing postures as consciously as an adult, and thus embodiments of the invention aid in supervision efforts of adults in regulating the posture of their children while viewing device screens.

Figure 1:
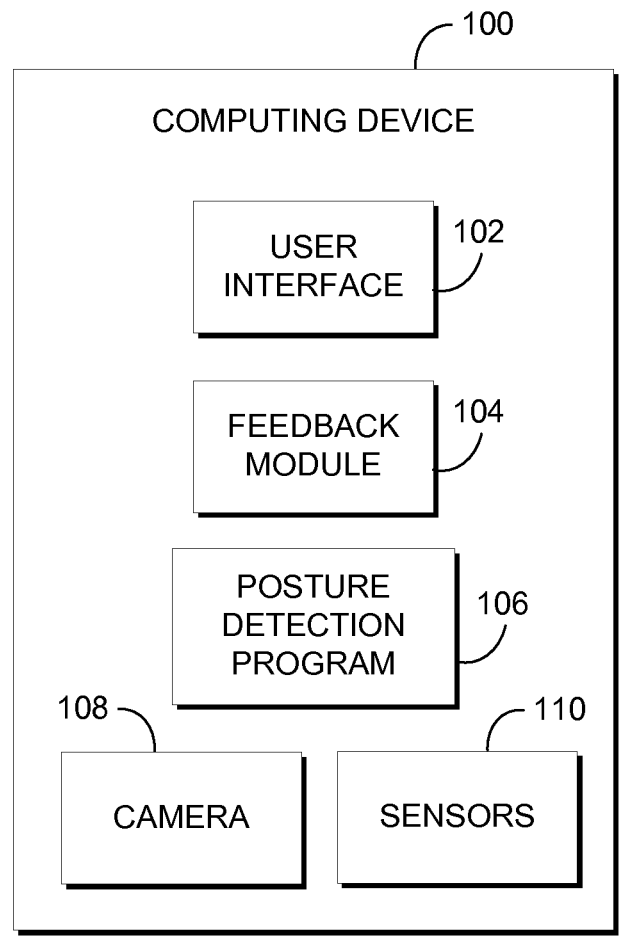
FIG. 1 depicts a block diagram illustrating a computing device, in accordance with an embodiment of the present invention.

The present invention will now be described in detail with reference to the Figures. FIG. 1 depicts a block diagram illustrating a computing device, generally designated 100, in accordance with an embodiment of the present invention. Modifications to computing device 100 may be made by those skilled in the art without departing from the scope of the invention as recited by the claims. In an exemplary embodiment, computing device 100 includes user interface (UI) 102, feedback module 104, posture detection program 106, camera 108, and sensors 110.

In various embodiments of the present invention, computing device 100 can be a laptop computer, a tablet computer, a netbook computer, a personal computer (PC), a desktop computer, a personal digital assistant (PDA), a smart phone, a thin client, a wearable device, or any programmable mobile electronic device capable of executing computer readable program instructions. Computing device 100 may include internal and external hardware components, as depicted and described in further detail with respect to FIG. 7.

UI 102 may be, for example, a graphical user interface (GUI) or a web user interface (WUI) and can display text, documents, web browser windows, user options, notifications, application interfaces, and instructions for operation, and includes the information (such as graphic, text, and sound) a program presents to a user and the control sequences the user employs to control the program. UI 102 is capable of receiving data, user commands, and data input modifications from a user. UI 102 is also capable of communicating with posture detection program 106, feedback module 104, camera 108, and sensors 110, and displaying notifications based on data obtained from posture detection program 106, feedback module 104, camera 108, and/or sensors 110. In some embodiments, UI 102 can be integrated with feedback module 104 and/or posture detection program 106.

Feedback module 104 is a component which generates feedback to a user, in response to data gathered by posture detection program 106, detecting an improper viewing posture of a user. In this exemplary embodiment, feedback module 104 sends feedback to UI 102 in the form of a written message. In other embodiments, feedback module 104 may generate any type of feedback in response to the detection of an improper viewing posture of a user, including haptic feedback, visual feedback, and audio feedback. In some embodiments, feedback module 104 is integrated with UI 102.

In this exemplary embodiment, posture detection program 106 can communicate with camera 108 and sensors 110 to receive data about the angle, distance, and/or movement of computing device 100. Posture detection program 106 can determine, based on the gathered data, whether a user is in a correct viewing posture (i.e., predetermined safe distance and viewing angle), and if a user is not in a correct viewing posture, posture detection program 106 can send a notification to the user, via feedback module 104.

Camera 108 can be any computing device camera technology known in the art. In this exemplary embodiment, camera 108 is embedded within computing device 100 and can emit infrared rays. In other embodiments, camera 108 can be a separate component from computing device 100, and can communicate with computing device 100 through a wired or wireless connection. Camera 108 can identify the eyes of a user, based on predetermined eye characteristics, and can communicate a distance between the eyes of the user and the camera to posture detection program 106.

In this exemplary embodiment, sensor(s) 110 can be any sensor, or combination of sensors, including, for example, gravity sensors, orientation sensors, accelerometers, and geomagnetic field sensors. Sensor(s) 110 can gather data, such as computing device 100 orientation and/or position information, and send the gathered information to posture detection program 106.

Figure 2A:
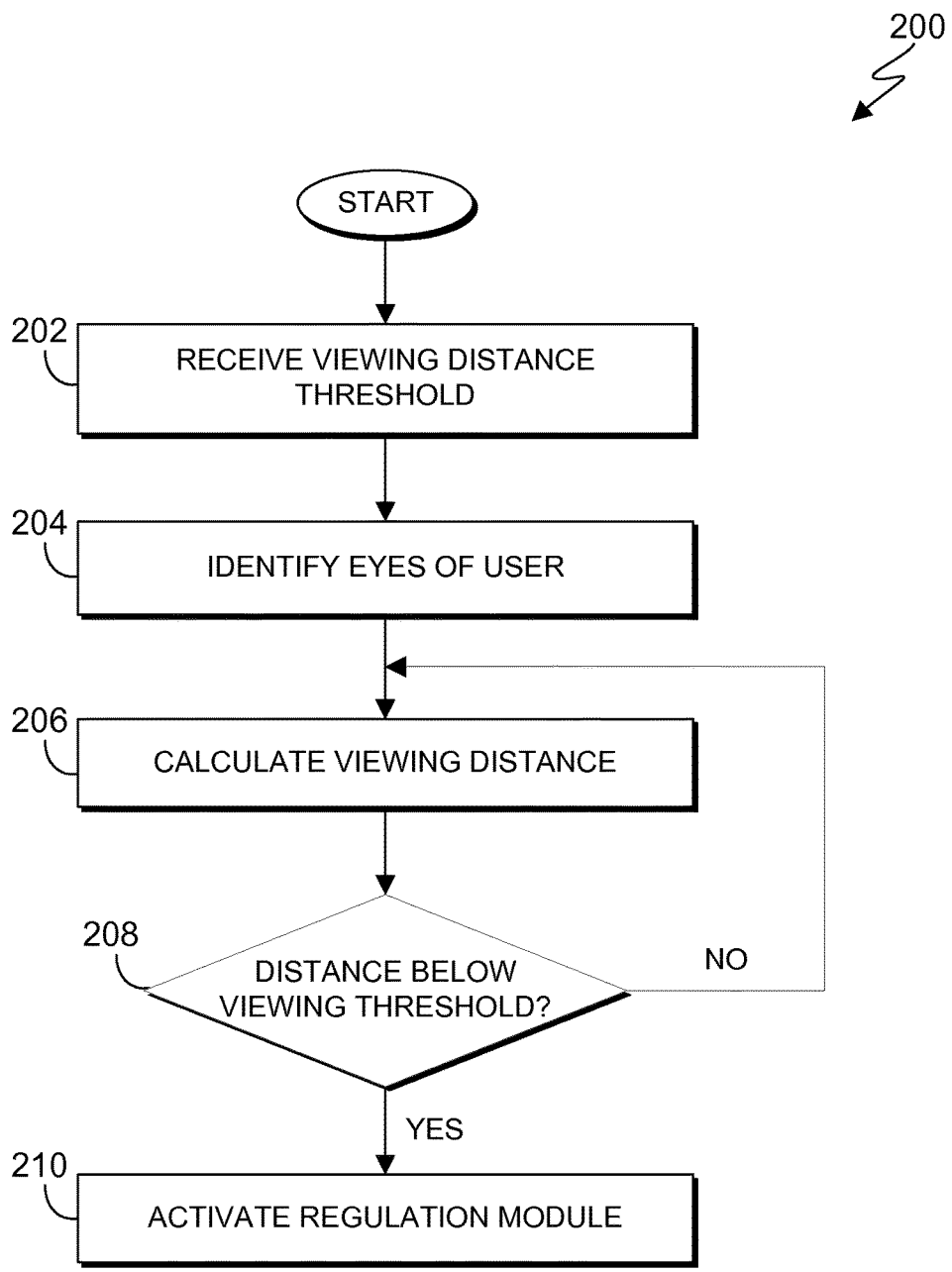
FIG. 2A depicts a flowchart illustrating operational steps for detecting that a user is viewing a display too closely, in accordance with an embodiment of the present invention.

FIG. 2A depicts flowchart 200 illustrating operational steps of posture detection program 106 for detecting that a user is viewing a device screen too closely, in accordance with an embodiment of the present invention.

In step 202, posture detection program 106 receives a viewing distance threshold. In this exemplary embodiment, a manufacturer of computing device 100 sends a viewing distance threshold for a specific computing device, which is determined from scientific study results. In other embodiments, a threshold distance may be included with computing device 100. In some embodiments, the viewing distance threshold may be different depending on the computing device (i.e., one threshold distance for a particular smartphone, and a different threshold distance for a particular tablet device).

In step 204, a camera, such as camera 108, of computing device 100 identifies the eyes of a user. In this exemplary embodiment, when computing device 100 is turned on, an embedded, front-facing, camera 108 identifies the eyes of a user, based on a set of predetermined eye attributes. For example, attributes to define the eyes of a user may be: for a single eye, the outline is olivary, and there is a circle in the middle, which takes up about 30% to 50% of the area; eyes are always in axisymmetric pairs because the face of a user is usually parallel to the screen while they are viewing a device; and the centric part of each eye is colorful, such as black, brown, green, blue, or amber, and the rest of the eye is white. In other embodiments, a user's eyes may be defined using any set of attributes, including a specific eye color or eye size (i.e., the eyes of a child may be a smaller size than the eyes of an adult).

In step 206, posture detection program 106 calculates the viewing distance between the identified eyes of a user and the device screen. In this exemplary embodiment, camera 108 can emit an infrared ray, which is used in measuring the distance between the eyes of a user and the device screen (i.e., the viewing distance). By calculating the endpoint of the viewing distance as the user's eye, the error value is less than 5 mm. In order to calculate the viewing distance, the distance from camera 108 and the central horizontal line is obtained (a constant value that the manufacturer of the device can set) and the distance between the user's eye and camera 108 is obtained. The distance between the user's eye and the screen (i.e., the viewing distance) can then be calculated using the above two obtained values (described in further detail with respect to FIG. 4A).

In step 208, posture detection program 106 determines whether the viewing distance is below the received viewing threshold. Posture detection program 106 continuously receives and monitors the viewing distance of the user. In this exemplary embodiment, the viewing distance is below a received viewing threshold when posture detection program 106 determines that the measured distance between the eyes of the user and the device screen is less than the viewing distance threshold, received from the manufacturer (i.e., a user is too close to the device screen).

If, in step 208, posture detection program 106 determines that the viewing distance is below the received viewing threshold, indicating that the user is too close to the device screen, then, in step 210, posture detection program 106 activates feedback module 104 (described in FIG. 3).

If, in step 208, posture detection program 106 determines that the viewing distance is not below the received viewing threshold, then posture detection program 106 continues to calculate and monitor the distance of the device from the eyes of the user (i.e., step 206).

Figure 2B:
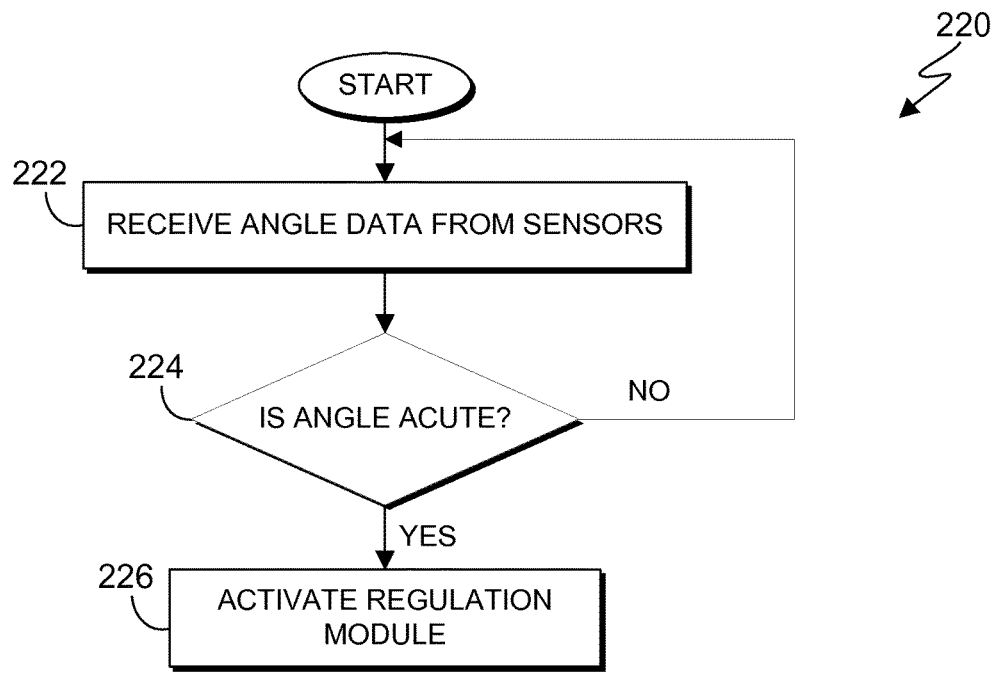
FIG. 2B depicts a flowchart illustrating operational steps for detecting that a user is viewing a display while lying down, in accordance with an embodiment of the present invention.

FIG. 2B depicts flowchart 220 illustrating operational steps of posture detection program 106 for detecting that a user is viewing a display while lying down, in accordance with an embodiment of the present invention.

In step 222, posture detection program 106 receives angle data from sensors 110. In this exemplary embodiment, when the screen is on, an embedded sensor(s) 110 continuously measures the angle of computing device 100 against the horizon. In some embodiments, APP developers can use the application program interfaces (APIs) provided by the operating system (OS) providers to detect the motions of the device, enabling the APPs to be motion controlled. For example, APP developers can design motion controlled APPs for various brands and products.

In step 224, posture detection program 106 determines whether the angle of computing device 100 against the horizon is acute. The angle against the horizon is acute if the angle is less than 90 degrees (i.e., less than a right angle). In this exemplary embodiment, an angle that is less than 90 degrees is an indication that the user is lying down while viewing computing device 100. In other embodiments, any angle which may be predetermined to be an unsafe viewing angle may be used as the threshold angle against the horizon of computing device 100.

Figure 3:
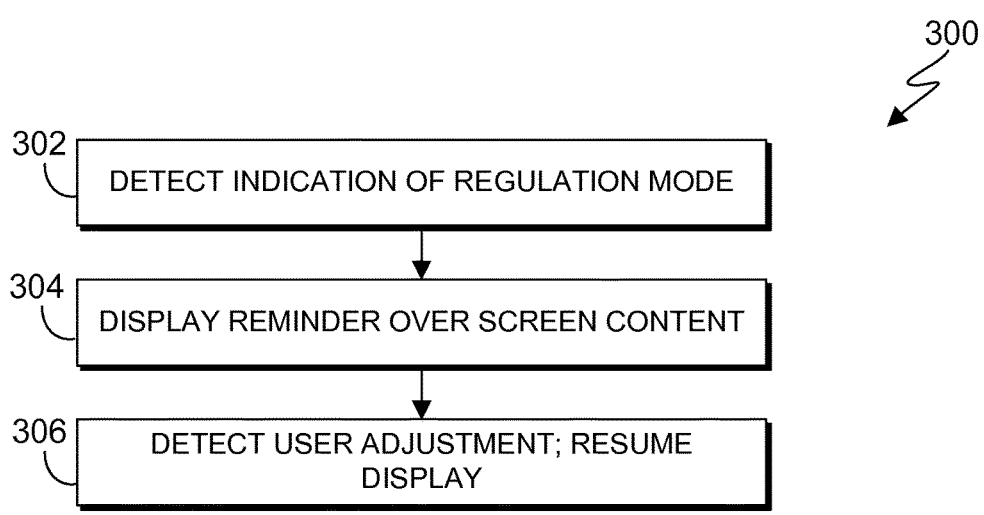
FIG. 3 depicts a flowchart illustrating operational steps for providing feedback to adjust the viewing posture of a user, in accordance with an embodiment of the present invention.

If, in step 224, posture detection program 106 determines that the angle of computing device 100 against the horizon is acute, then, in step 226, posture detection program 106 activates feedback module 104 (described in FIG. 3).

If, in step 224, posture detection program determines that the angle of computing device 100 against the horizon is not acute (i.e., the angle is greater than 90 degrees), then posture detection program 106 continues to monitor the angle degree by analyzing received angle data from sensors 110. In this exemplary embodiment, an angle that is not acute is an indication that the user is viewing computing device 100 at a safe viewing angle.

FIG. 3 depicts a flowchart 300 illustrating operational steps for providing feedback to adjust the viewing posture of a user, in accordance with an embodiment of the present invention.

In step 302, posture detection program 106 detects an indication that feedback module 104 is activated (i.e., from step 210 of FIG. 2A or step 226 of FIG. 2B).

In step 304, feedback module 104 displays a reminder over the screen content. In this exemplary embodiment, the operating system (OS) of computing device 100 pauses the applications and content running on the device, and the content on the device screen becomes fuzzy when a reminder is displayed on the device screen. A reminder indicating the improper posture, and how to fix the improper posture may appear on the screen, such as "You are too close to the screen; please move the screen further from you" or "It detects you are watching lying down; please sit up to protect your eyes." In other embodiments, there is a 'time-out' period in which the operating system may pause the device content for a predetermined period of time, until the user changes their viewing position.

In step 306, posture detection program 106 detects a user adjustment to the computing device 100. In this exemplary embodiment, a user may adjust their posture after receiving the reminder displayed on the screen. For example, a user may sit up rather than lying down if posture detection program 106 indicates an acute angle, or increase the viewing distance if posture detection program 106 indicates the user is too close to the device. After a user adjustment has been detected, the OS of computing device 100 resumes the prior operations (e.g., if a video was playing prior to the reminder display, the video resumes playing). In other embodiments, the OS resumes the prior operations responsive to a user gesture. For example, the OS may resume operations responsive to a user gesture dismissing the reminder, such as a tap on the screen of a touch device.

Figure 4A:
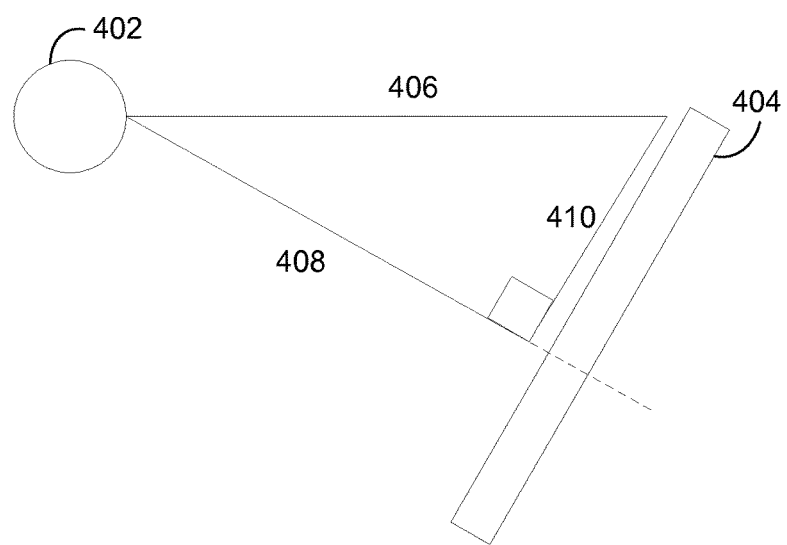
FIG. 4A depicts an example of a user viewing a device for calculating the distance between a user's eye and the device camera, in accordance with an embodiment of the present invention.

FIG. 4A depicts an example of a user viewing a device for calculating the distance between a user's eye and the embedded device camera, in accordance with an embodiment of the present invention.

To calculate the viewing distance 408, the length 410 is needed (i.e., the distance from the embedded front-facing camera 108 and the central horizontal line, which is the center of the device). The length 410 is a constant value, which may be obtained or set by the manufacturer of the particular computing device. The distance 406 between the eye of the user 402 and the camera 108 of computing device 404 is also needed. This value may be obtained by the embedded front-facing camera 108, which focuses on the identified eye of the user. In this exemplary embodiment, the embedded front-facing camera 108 can emit infrared rays, which are used to measure the viewing distance 408 of a user. Infrared rays are used to measure the distance from the focused object (e.g., the eye of the user) to the camera in an 'auto-focus' mode. This is derived from the optical principle of the Gaussian formula recited in Equation 1:

$$\frac{1}{f} = \frac{1}{u} + \frac{1}{v} \qquad \text{(Equation 1)}$$

In this Equation 1, f is the focus length, u is the distance from the lens to the object, and v is the distance from the lens to the image. After obtaining the values for f and u, by applying Equation 1, camera 108 can determine what the distance from the lens to the image (v) should be, and can make the adjustment accordingly in order to generate a high-quality image.

The viewing distance 408 between the eye of the user 402 and the computing device 404 screen may be obtained using the Pythagorean theorem recited in Equation 2:

$$Ds = \sqrt{Dc^2 - L^2} \qquad \text{(Equation 2)}$$

In this Equation 2, Ds represents the viewing distance 408, Dc represents the distance 406 between the eye of the user 402 and the camera 108, and L represents the length 410. This principle can be applied to obtain a viewing distance 408 (i.e., the distance between the camera and the eye of a user 402), by using components already integrated with computing device 404 (e.g., an embedded front-facing camera) and known optical principles, (i.e., Equations 1 and 2, as described above).

Figure 4B:
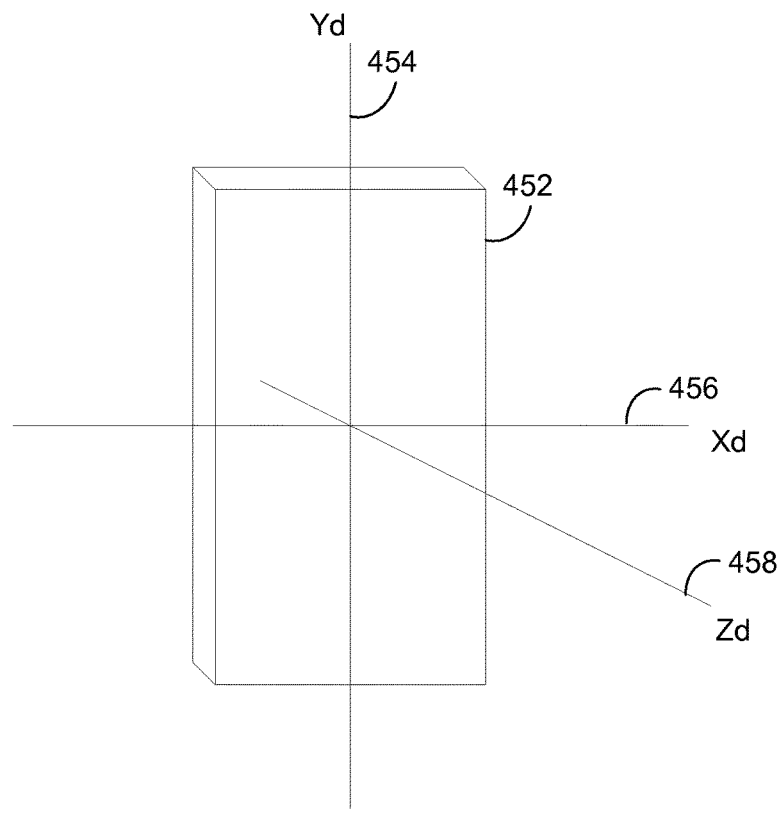
FIG. 4B depicts an example of the sensor coordinates used to determine a user's viewing angle, in accordance with an embodiment of the present invention.

FIG. 4B depicts an example of the sensor coordinates used to determine a user's viewing angle, in accordance with an embodiment of the present invention.

In order to determine a user's viewing position (i.e., if the user is lying down), APIs provided by the embedded sensors are used. In the depicted example, device 452 contains an orientation sensor (not shown) which is software-based, and derives its data from an accelerometer and a geomagnetic field sensor. The orientation sensor can be used to monitor the position of a device relative to the Earth's frame of reference (i.e., magnetic north). Further, certain commands (e.g., getOrientation( ) on an Android platform) can compute the orientation of device 452, based on the rotation matrix. When it returns, the array values may be filled with, for example, the following results: values[0]: azimuth, degrees of rotation around the z axis; values[1]: pitch, degrees of rotation around the x axis; and values[2]: roll, degrees of rotation around the y axis, where the reference coordinate system is as follows: Xd (i.e., x-axis 456) is defined as the vector product y.z (it is tangential to the ground at the device's current location and roughly points West); Yd (i.e., y-axis 454) is tangential to the ground at the device's current location and points towards the magnetic North Pole; and Zd (i.e., z-axis 458) points towards the center of the Earth and is perpendicular to the ground.

In this example, the rotations around the x-axis 456 or the y-axis 454 are relevant, as the x-y plane is parallel to the ground (i.e., the horizon). A rotation around the z-axis 458 is not relevant in this calculation, as movement in this plane does not change the angle of the device against the ground. For example, if device 452 is lying on a flat surface, with the screen facing upwards, x-axis 456 equals -x, y-axis 454 equals y, and z-axis 458 equals -z. The degree values of device 452 against the x-axis and the y-axis are all zero in this example. When device 452 begins to rotate around the x-axis 456 with the z-axis 458 in the y direction, the rotation degree is positive. When device 452 begins to rotate around the x-axis 456 with z-axis 458 in the -y direction, the rotation degree is negative. If the rotation degree is found to be in the range of (-180° to -90°) and (90° to 180°), the screen is in a downward facing direction, which means that the angle against the ground is acute (less than 90°). This same range can be obtained for the rotation around the y-axis 454, in which case the screen is also downward and the angle against the ground is acute (depicted further in FIGS. 5A and 5B).

In other embodiments, the device may use iOS, in which case Core Motion Framework is provided, according to which an instance of CMDeviceMotion encapsulates measurements of the attitude of a device. An instance of the CMAttitude class represents a measurement of the device's attitude at a point in time. A device's attitude refers to the orientation of a body relative to a given frame of reference (i.e., the device's orientation relative to a point of reference, such as the horizon or the ground). Similar algorithms as those described above can be used to obtain the angle of the device relative to the ground.

Figure 5A:
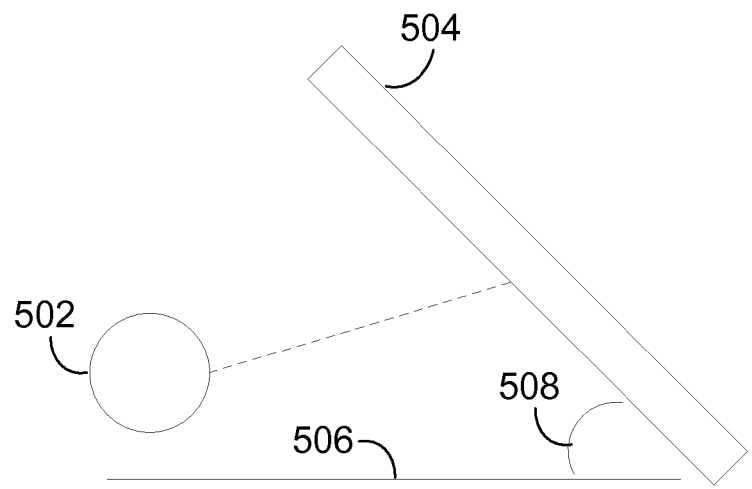
FIGS. 5A and 5B depict examples of different user viewing angles, in accordance with an embodiment of the present invention.
Figure 5B:
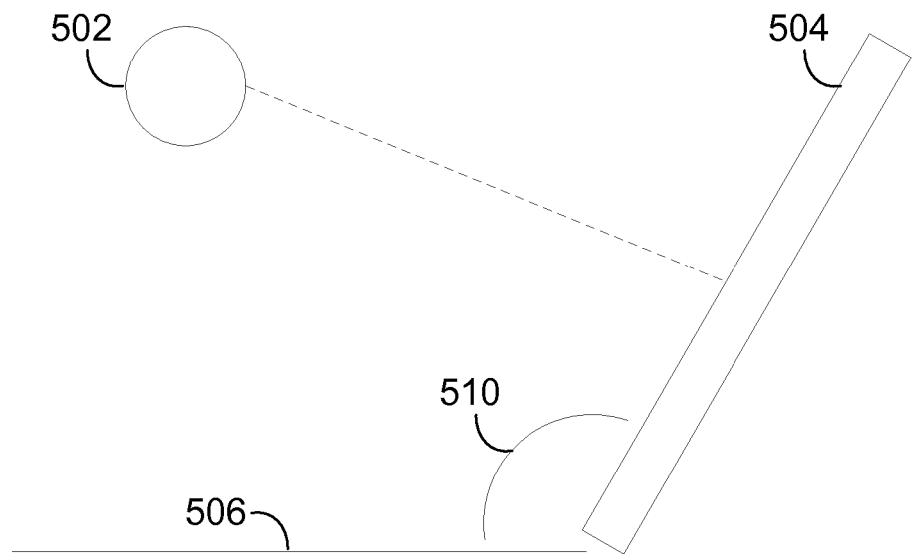

FIGS. 5A and 5B depict examples of different user viewing angles, in accordance with an embodiment of the present invention.

FIG. 5A depicts a user 502 viewing device 504 at an acute angle 508 relative to ground 506. In this example, posture detection program 106, using the methods described with respect to FIGS. 2B and 4B, can detect that a user 502 is viewing device 504 at an angle that is less than 90° (i.e., downward displaying screen), and thus is viewing the device lying down, which is considered an improper/unsafe viewing posture.

FIG. 5B depicts the user 502 viewing device 504 at an obtuse (i.e., greater than 90°) angle 510 relative to ground 506. In this example, posture detection program 106, using the methods described with respect to FIGS. 2B and 4B, can detect that a user 502 is viewing device 504 at an angle that is greater than 90°, and thus is viewing the device using a proper viewing posture.

Figure 6A:
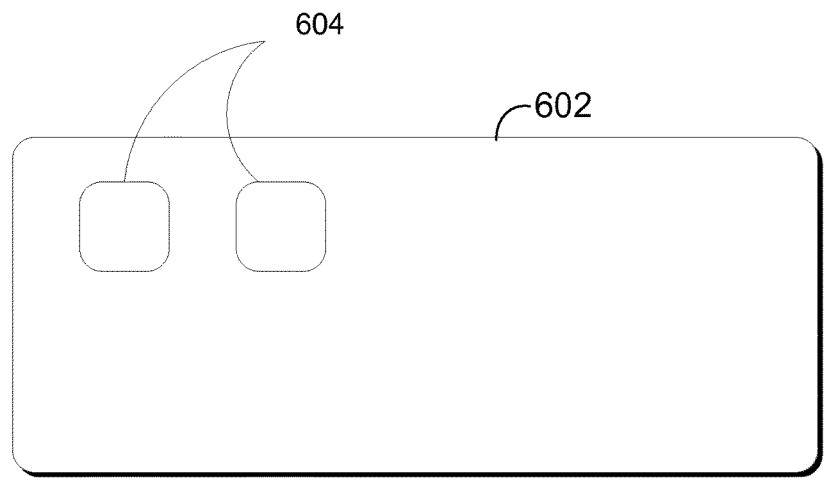
FIGS. 6A and 6B depict an example of a reminder displayed to a user when viewing the device using an improper viewing posture, in accordance with an embodiment of the present invention.
Figure 6B:
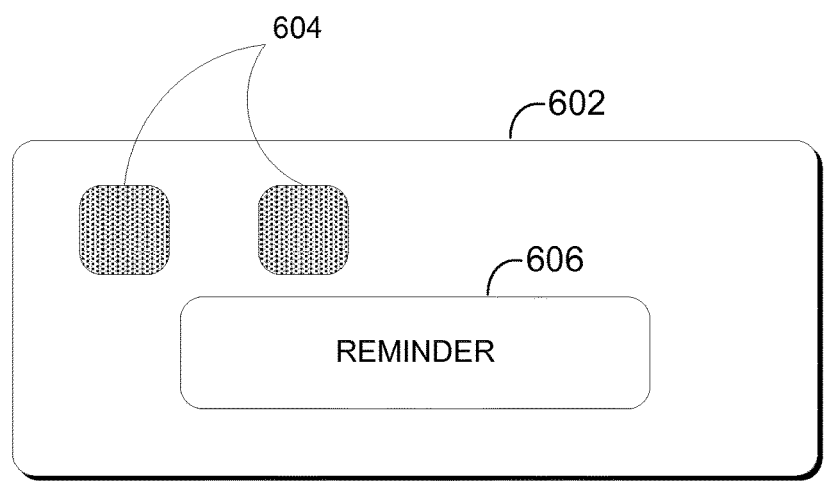

FIGS. 6A and 6B depict an example of a reminder displayed to a user when viewing the device using an improper viewing posture, in accordance with an embodiment of the present invention.

FIG. 6A depicts an example of device 602, displaying applications 604, in normal use by a user. FIG. 6B depicts an example of device 602, after posture detection program 106 detects an improper viewing posture of the user (e.g., viewing too close to the device or viewing while lying down). In this exemplary embodiment, the device operating system causes applications 604 to 'pause' (i.e., become temporarily disabled) and a reminder 606 is shown on the screen of device 602. Reminder 606 may contain a more specific message, such as "You are too close to the screen; please move the screen further away from you" or "It detects you are watching lying down; please sit up to protect your eyes" depending on the detected improper viewing posture of the user. Device 602 displays both an indication to the user that they are using an improper viewing posture, and an indication as to how the user can adjust their viewing posture to a safer one (e.g., move device further from eyes, or sit up so not watching the device lying down). In this exemplary embodiment, the user can proceed to view the content on the device after posture detection program 106 detects the user has adjusted their posture. In other embodiments, the user may 'tap' the reminder, or perform another gesture which indicates they have seen the reminder, and have adjusted their position. In yet another embodiment, the reminder may display for a certain period of time (e.g., 10 seconds), and then disappear, allowing the OS to resume the operations.

Figure 7:
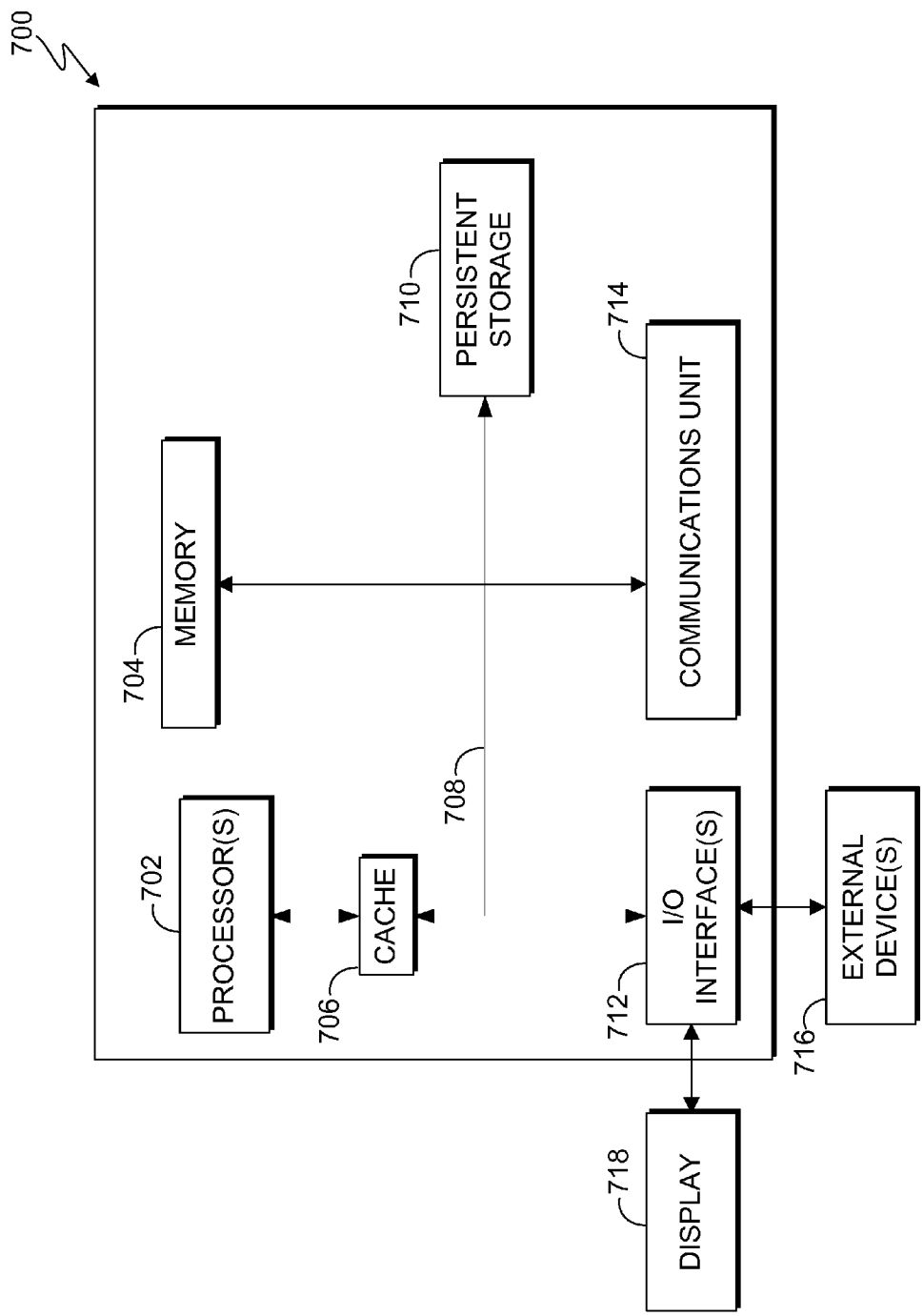
FIG. 7 depicts a block diagram of components of a computing device, in accordance with an illustrative embodiment of the present invention.

FIG. 7 is a block diagram of internal and external components of a computing device, generally designated 700, which is representative of the computing devices of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 700 includes communications fabric 708, which provides communications between computer processor(s) 702, memory 704, cache 706, persistent storage 710, communications unit 714, and input/output (I/O) interface(s) 712. Communications fabric 708 can be implemented with any architecture designed for passing data and/or control information between processors (such as microprocessors, communications and network processors, etc.), system memory, peripheral devices, and any other hardware components within a system. For example, communications fabric 708 can be implemented with one or more buses.

Memory 704 and persistent storage 710 are computer-readable storage media. In this embodiment, memory 704 includes random access memory (RAM). In general, memory 704 can include any suitable volatile or non-volatile computer readable storage media. Cache 706 is a fast memory that enhances the performance of processors 702 by holding recently accessed data, and data near recently accessed data, from memory 704.

Program instructions and data used to practice embodiments of the present invention may be stored in persistent storage 710 and in memory 704 for execution by one or more of the respective processors 702 via cache 706. In an embodiment, persistent storage 710 includes a magnetic hard disk drive. Alternatively, or in addition to a magnetic hard disk drive, persistent storage 710 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 710 may also be removable. For example, a removable hard drive may be used for persistent storage 710. Other examples include optical and magnetic disks, thumb drives, and smart cards that are inserted into a drive for transfer onto another computer readable storage medium that is also part of persistent storage 710.

Communications unit 714, in these examples, provides for communications with other data processing systems or devices, including resources of a network. In these examples, communications unit 714 includes one or more network interface cards. Communications unit 714 may provide communications through the use of either or both physical and wireless communications links. Program instructions and data used to practice embodiments of the present invention may be downloaded to persistent storage 710 through communications unit 714.

I/O interface(s) 712 allows for input and output of data with other devices that may be connected to computing device 700. For example, I/O interface 712 may provide a connection to external devices 716 such as a keyboard, keypad, a touch screen, and/or some other suitable input device. External devices 716 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 710 via I/O interface(s) 712. I/O interface(s) 712 also connect to a display 718.

Display 718 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product, for regulating viewing posture, the computer program product comprising:
    a computer readable storage medium and program instructions stored on the computer readable storage medium, the program instructions comprising:
    program instructions to identify a single eye of a user of a device, based on a set of attributes of the single eye;
    program instructions to calculate a distance between the single eye of the user of the device and a screen of the device;
    program instructions to determine the distance between the single eye of the user of the device and the screen of the device, based on the distance between the front-facing camera and the single eye of the user of the device and the distance between the front-facing camera and a center of the device;
    program instructions to determine whether the distance between the single eye of the user of the device and the screen of the device is below a threshold, wherein the threshold is a predetermined distance, based on a type of the device in use;
    responsive to determining that the distance between the single eye of the user of the device and the screen of the device is below the threshold, program instructions to send feedback to the user of the device;
    program instructions to disable a plurality of applications in use, as contained within the screen of the device, while simultaneously sending the feedback to the user of the device, wherein the feedback is a respective message associated with detecting an improper viewing posture-type; and
    program instructions to detect the improper viewing posture-type, wherein the improper viewing posture-type comprises: the user positioned is close to the screen of the device based on the distance between the single eye of the user of the device and the screen of the device and the orientation of the user relative to the screen of the device.

2. The computer program product of claim 1, wherein the program instructions to detect the improper viewing posture-type, comprise:
    program instructions to receive information detailing an angle of the device relative to a vantage point;
    program instructions to determine whether the angle of the device relative to the vantage point is greater than zero degrees and less than 90 degrees; and
    program instructions to, responsive to determining that the angle of the device relative to the vantage point is greater than or equal to zero degrees and less than 90 degrees, send the feedback to the user of the device.

3. The computer program product of claim 2, further comprising:

program instructions to pause a set of device operations;
program instructions to display a message to the user of the device, wherein the message details: an improper posture and a suggested adjustment of the improper posture; and
program instructions to, responsive to determining that the user of the device has adjusted the improper posture, resume the set of device operations.

4. The computer program product of claim 3, wherein the improper posture comprises one of: viewing the device below a distance threshold and viewing the device in a lying down position.

5. The computer program product of claim 2, wherein the program instructions to determine whether the angle of the device relative to the vantage point is greater than or equal to zero degrees and less than 90 degrees comprise:
program instructions to gather data from an orientation sensor of the device, relative to the vantage point; and
program instructions to compute an orientation of the device relative to the vantage point, based on a rotation matrix, wherein the rotation matrix comprises a number of degrees of rotation around an x-axis, a y-axis, and a z-axis.

6. The computer program product of claim 1, wherein the program instructions to calculate the distance between the single eye of the user of the device and the screen of the device comprise:
program instructions to determine a distance between a front-facing camera and the center of the device; and
program instructions to calculate the distance between the front-facing camera and the single eye of the user of the device, using a distance obtained from information associated with the emitted infrared ray and the distance between the front-facing camera and the center of the device.

7. The computer program product of claim 1, wherein the device comprises program instructions to simultaneously calculate the distance between the single eye of the user of the device and the screen of the device and calculate an angle of the device relative to a vantage point.

8. A computer system for regulating viewing posture, the computer system comprising:
one or more computer processors;
one or more computer readable storage media;
program instructions stored on the one or more computer readable storage media for execution by at least one of the one or more processors, the program instructions comprising:
program instructions to identify single eye of a user of a device, based on a set of attributes of the single eye;
program instructions to calculate a distance between the single eye of the user of the device and a screen of the device;
program instructions to determine the distance between the single eye of the user of the device and the screen of the device, based on the distance between the front-facing camera and the single eye of the user of the device and the distance between the front-facing camera and a center of the device;
program instructions to determine whether the distance between the single eye of the user of the device and the screen of the device is below a threshold, wherein the threshold is a predetermined distance, based on a type of the device in use;
responsive to determining that the distance between the single eye of the user of the device and the screen of the device is below the threshold, program instructions to send feedback to the user of the device;
program instructions to disable a plurality of applications in use, as contained within the screen of the device, while simultaneously sending the feedback to the user of the device, wherein the feedback is a respective message associated with detecting an improper viewing posture-type; and
program instructions to detect the improper viewing posture-type, wherein the improper viewing posture-type comprises: the user positioned is close to the screen of the device the distance between the single eye of the user of the device and the screen of the device, and the orientation of the user relative to the screen of the device.

9. The computer system of claim 8, wherein the program instructions to detect the improper viewing posture-type, comprise:
program instructions to receive information detailing an angle of the device relative to a vantage point;
program instructions to determine whether the angle of the device relative to the vantage point is greater than zero degrees and less than 90 degrees; and
program instructions to, responsive to determining that the angle of the device relative to the vantage point is greater than or equal to zero degrees and less than 90 degrees, send the feedback to the user of the device.

10. The computer system of claim 9, further comprising:
program instructions to pause a set of device operations;
program instructions to display a message to the user of the device, wherein the message details: an improper posture and a suggested adjustment of the improper posture; and
program instructions to, responsive to determining that the user of the device has adjusted the improper posture, resume the set of device operations.

11. The computer system of claim 10, wherein the improper posture comprises one of: viewing the device below a distance threshold and viewing the device in a lying down position.

12. The computer system of claim 9, wherein the program instructions to determine whether the angle of the device relative to the vantage point is greater than or equal to zero degrees and less than 90 degrees comprise:
program instructions to gather data from an orientation sensor of the device, relative to the vantage point; and
program instructions to compute an orientation of the device relative to the vantage point, based on a rotation matrix, wherein the rotation matrix comprises a number of degrees of rotation around an x-axis, a y-axis, and a z-axis.

13. The computer system of claim 8, wherein the program instructions to calculate the distance between the single eye of the user of the device and the screen of the device comprise:
program instructions to emit an infrared ray, wherein the emitted infrared ray ends at the single eye of the user of the device;
program instructions to determine a distance between a front-facing camera and the center of the device; and
program instructions to calculate the distance between the front-facing camera and the single eye of the user of the device, using a distance obtained from information associated with the emitted infrared ray and the distance between the front-facing camera and the center of the device.

14. The computer system of claim 8, wherein the device comprises program instructions to simultaneously calculate the distance between the single eye of the user of the device and the screen of the device and calculate an angle of the device relative to a vantage point.

\* \* \* \* \*